(12) United States Patent
Kedem

(10) Patent No.: US 7,765,243 B2
(45) Date of Patent: Jul. 27, 2010

(54) UNIFIED LOCAL-REMOTE LOGICAL VOLUME

(75) Inventor: Noam Kedem, Foster City, CA (US)

(73) Assignee: Sandisk IL Ltd., Kfar Saba (IL)

( * ) Notice: Subject to any disclaimer, the term of this patent is extended or adjusted under 35 U.S.C. 154(b) by 0 days.

(21) Appl. No.: 10/981,657

(22) Filed: Nov. 5, 2004

(65) Prior Publication Data

US 2006/0020637 A1    Jan. 26, 2006

Related U.S. Application Data

(60) Provisional application No. 60/590,847, filed on Jul. 26, 2004.

(51) Int. Cl.
*G06F 12/00* (2006.01)
*G06F 17/30* (2006.01)

(52) U.S. Cl. ...................... 707/822; 707/828
(58) Field of Classification Search ............. 707/102, 707/722
See application file for complete search history.

(56) References Cited

U.S. PATENT DOCUMENTS

| | | | | |
|---|---|---|---|---|
| 5,953,514 A * | 9/1999 | Gochee | ...................... | 717/138 |
| 5,978,815 A * | 11/1999 | Cabrera et al. | ............... | 707/204 |
| 6,269,382 B1 * | 7/2001 | Cabrera et al. | ............... | 707/204 |
| 6,438,590 B1 * | 8/2002 | Gartner et al. | ............... | 709/219 |
| 6,754,696 B1 * | 6/2004 | Kamath et al. | ............... | 709/213 |
| 6,976,180 B2 * | 12/2005 | Cupps et al. | ................ | 713/300 |
| 7,024,427 B2 * | 4/2006 | Bobbitt et al. | ............... | 707/200 |
| 7,246,140 B2 * | 7/2007 | Therrien et al. | .............. | 707/202 |
| 7,518,620 B2 * | 4/2009 | Faraj | ........................... | 345/629 |
| 2002/0143859 A1 * | 10/2002 | Kuki et al. | .................. | 709/203 |
| 2003/0088594 A1 * | 5/2003 | Hamadi | ..................... | 707/205 |
| 2004/0019640 A1 * | 1/2004 | Bartram et al. | ............. | 709/205 |
| 2004/0255048 A1 * | 12/2004 | Lev Ran et al. | ............. | 709/249 |
| 2005/0091289 A1 * | 4/2005 | Shappell et al. | ............. | 707/201 |
| 2005/0131959 A1 * | 6/2005 | Thorman et al. | ............ | 707/200 |

OTHER PUBLICATIONS

Joachim Eibl., "Directory Comparison and Merge with Kdiff3", 2003, http://computing.ee.ethz.ch/sepp/kdiff3-0.9.61-ds/dirmergedocs.html.*
International Preliminary Report on Patentability and Written Opinion received in corresponding PCT Application No. PCT/IL2005/000787 from the International Bureau mailed Jan. 30, 2007, 6 pages.
Chapman, Greg. "Clean Up the Neighborhood," Computor Companion - The Practical Guide to Using Computers Effectively, http://www.computorcompanion.com/LPMArticle.asp?ID=172, printed Aug. 26, 2004, 6 pages.

* cited by examiner

*Primary Examiner*—Hosain T Alam
*Assistant Examiner*—Shew-Fen Lin
(74) *Attorney, Agent, or Firm*—Toler Law Group

(57) ABSTRACT

A method of managing local and remote data storage including displaying to a user, as a single logical volume, file names referencing both local data files and remote data files. The user individually selects file names and assigns a location attribute to the file names: residing only on the remote data storage, residing only the local data storage; residing on both the local data storage and the remote data storage. The location attribute of residing only on the remote data storage causes the local data file to be erased. The location attribute of residing only on the local data storage causes the remote data file to be erased. The location attribute, of residing on both the local data storage and the remote data storage, causes the files to be synchronized.

17 Claims, 4 Drawing Sheets

C: {local files}
aaa
bbb
ddd
F: {remote files}
aaa
bbb
ccc

| My files | local | remote |
|----------|-------|--------|
| aaa | x | x |
| bbb | x | x |
| ccc |   | x |
| ddd | x |   |

UNIFIED LOCAL-REMOTE LOGICAL VOLUME

CROSS REFERENCE TO RELATED APPLICATIONS

This application claims the benefit from U.S. provisional application 60/590,847 filed 26 Jul. 2004 by the present inventor.

FIELD AND BACKGROUND OF THE INVENTION

The present invention relates to data storage systems, and more particularly to a method for simultaneously managing data files in both local and remote data storage.

Computer systems allow processing of massive quantities of data for a variety of purposes. As the ability to process data has increased, so has the need for versatile data storage systems that provide massive data storage capabilities combined with fast access.

Network-based remote file storage is becoming increasingly popular, particularly with the advent of global wireless coverage. Large quantities, i.e. terabytes of file storage are accessible over wide area networks, e.g. the Internet. backup services are also accessible offering secure and remote storage for a monthly fee. Internet storage services enable global access to data typically based on FTP (File Transfer Protocol), or HTTP (hypertext transfer protocol).

Another feature required by many businesses and industries is portability. Portable systems such as personal computers, USB drives, mobile phones and other handheld devices have local storage, e.g. hard disk drives, flash memory drives, etc. Portable systems generally do not provide massive data storage that is generally accessible in fixed storage systems.

Using current file management schemes, e.g. Microsoft Windows®, files stored remotely, e.g. via the Internet, are displayed in a remote logical volume using a file browsing utility. Files stored locally and not stored remotely are displayed in a local logical volume different from the remote logical volume. Many users find multiple logical volumes to be unintuitive and complicated to use.

In other prior art file management schemes, e.g. a PALM® operating system a single logical volume, e.g. Addresses, is used for displaying simultaneously both local and remote storage when all the files of the single logical volume are synchronized, that is the files of the single logical volume are maintained in local storage and copies of the files are periodically updated, for instance, for back-up in remote storage. The prior art does not include a method for managing individual files simultaneously in both local and remote data storage in a single logical volume.

There is thus a need for, and it would be highly advantageous to have a method for managing individual files simultaneously in both local and remote data storage in a single logical volume.

SUMMARY OF THE INVENTION

According to the present invention there is provided a method of managing data storage in a computer. The data storage includes local data storage storing local data files and remote data storage storing remote data files. The method includes displaying to a user of the computer, as a single logical volume, file names referencing data files including the local data files and the remote data files on a display operatively connected to the computer. The user individually assigns for one or more file names a location attribute. The location attribute is selected from: (i) residing solely on the remote data storage, (ii) residing solely on the local data storage; or iii) residing on both the remote data storage and the local data storage. Preferably, the method further includes merging the local data files and the remote data files into the single logical volume. Preferably, the location attribute is further displayed to the user. Preferably, when the location attribute of the file name referencing the data file is: (i) residing solely on the remote data storage; the method further includes erasing the data file on the local data storage. Preferably, when the location attribute of the file name referencing the data file is: (ii) residing solely on the local data storage; the method further includes erasing the data file on the remote data storage. More preferably, when solely the local data storage is connected to the computer, the erasing is performed upon connecting the remote data storage to the computer. Preferably, when the location attribute of the file name referencing the data file is: (iii) residing on both the remote data storage and the local data storage; the method further includes: synchronizing the data file on both the remote data storage and the local data storage. More preferably, when solely the local data storage is connected to the computer, the synchronization is performed upon connecting the remote data storage to the computer.

According to the present invention there is provided a system for managing data storage in a computer including local data storage storing local data files and remote data storage storing remote data files, the system includes a display operatively connected to the computer for displaying in a single logical volume one or more file names referencing data files including the local data files and the remote data files; and an input mechanism for individually assigning for one or more of the file names a location attribute in the data storage. The location attribute is selected from: (i) residing on the remote data storage, (ii) residing on the local data storage; or iii) residing on both the remote data storage and the local data storage. Preferably, the display presents to the user the location attribute of the data files.

BRIEF DESCRIPTION OF THE DRAWINGS

The invention is herein described, by way of example only, with reference to the accompanying drawings, wherein:

FIG. 2 (prior art) is a drawing of a computer display showing file management of local and remote storage in multiple logical volumes;

DESCRIPTION OF THE PREFERRED EMBODIMENTS

Figure 1:
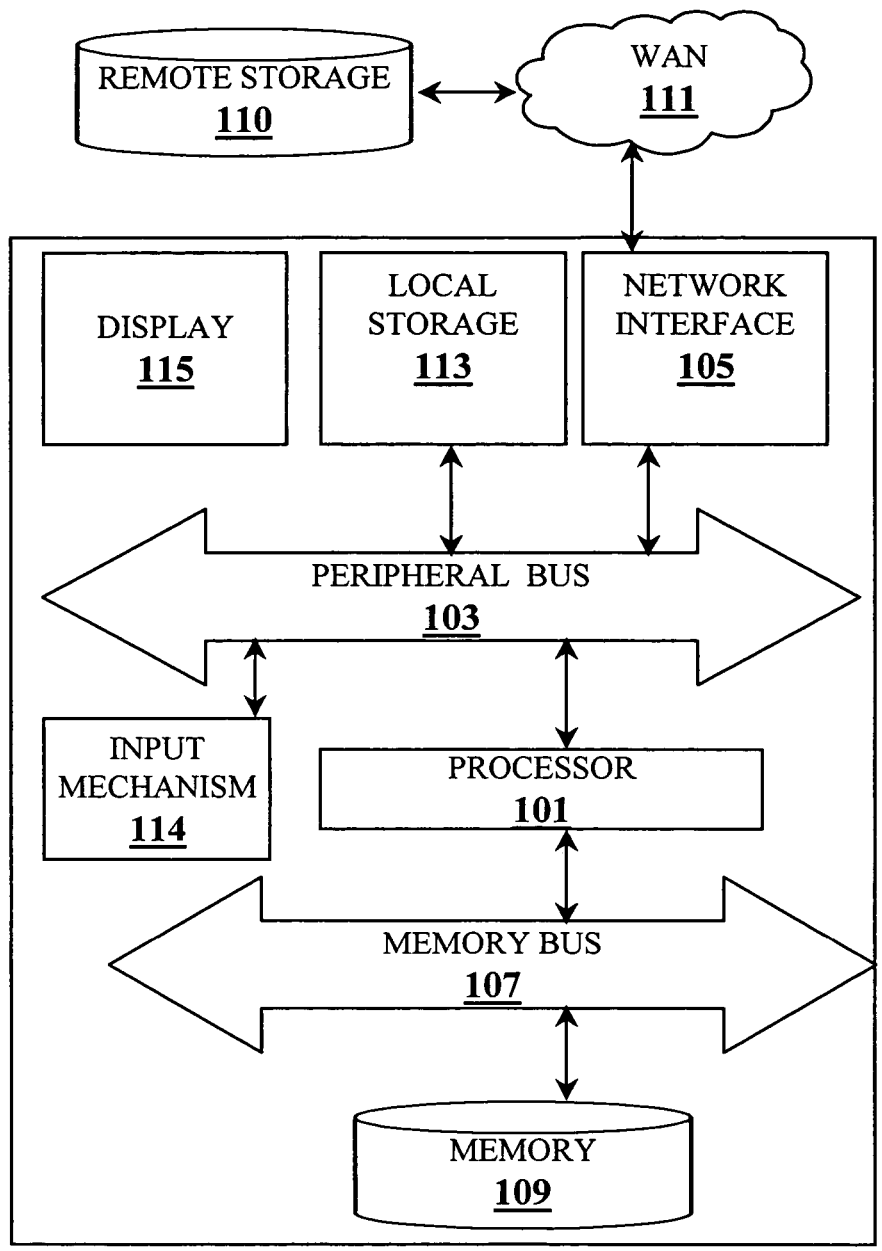
FIG. 1 (prior art) is a drawing of a conventional computer system with a connection to a network.

The present invention is a method for simultaneously managing data files in both local and remote data storage in a single logical volume. The principles and operation of managing data files in local and remote data storage simultaneously in a single logical volume, according to the present invention, may be better understood with reference to the drawings and the accompanying description.

It should be noted, that although the discussion herein relates to a general purpose file management system used for instance to manage files in a standard file browser of a personal computer, the present invention may, by non-limiting example, alternatively be configured as well in specialized computer applications and other systems requiring file management. The term "computer" as defined herein includes a desktop computer, a portable computer, a notebook computer, a handheld computer, a mobile telephone or any other computerized device. The term "logical volume" is defined herein as one or more areas of memory on one or more storage devices, e.g. disk drive that a user or application considers as a single entity. The term "file names" refers also to names of file folders. The term "synchronizing" as used herein refers to maintaining equivalent copies of a data file in different storage devices. The term "storage" refers to analog media, and digital storage media including random access memory, flash memory, magnetic media, optical media and EEPROM. The term "local storage" refers to storage that, in normal use, is always connected to a computer. The term "remote storage" refers to storage that is sometimes connected and sometimes disconnected such as with a network connection, e.g. the Internet. It should be noted that while the discussion herein is directed primarily to remote storage using the Internet, the principles of the present invention may be adapted for use in, and provide benefit for other types of remote storage such as a portable disk drive or otherwise connectable storage media such as USB flash memory. Further the interface mechanism for connecting and disconnecting storage to a computer may be of any such mechanisms known in the art including a physical interface, e.g. cable, a network interface or a wireless network interface.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to provide to a user a file management system of both local and remote storage that is simpler to use and more intuitive than prior art file management systems. The present invention provides the user with a versatile and intuitive file management system.

Referring now to the drawings, FIG. 1 is an illustration showing some of the components of a prior art computer 10, used for implementing an embodiment of the present invention. Computer 10 includes a processor 101, a storage mechanism including a memory bus 107 to store information in a memory 109. Computer 10 further includes a display 115, local storage 113, e.g. a hard disk drive, and an input mechanism 114, e.g. a mouse or keyboard. FIG. 1 further illustrates a network interface 105 connecting computer 10 via a wide area network 111 to remote storage 110.

FIG. 2 shows a prior art example of logical volumes as displayed to the user on a display 115a. Display 115a shows two logical volumes C: and F. Logical volume C: includes files stored on local storage 113. Logical volume F: includes files stored in remote storage 110. Files "aaa" and "bbb" are common to both logical volume C: and logical volume F. Files "aaa" and "bbb" are, for instance, synchronized in both local storage 113 and remote storage 110. For a typical user, the division of files between different logical volumes, in this case remote and local logical volumes is somewhat arbitrary and unintuitive. Furthermore, the repetition of synchronized files, for instance "aaa" and "bbb" in two different logical volumes A: and F: is a potential source of confusion.

Figure 3:
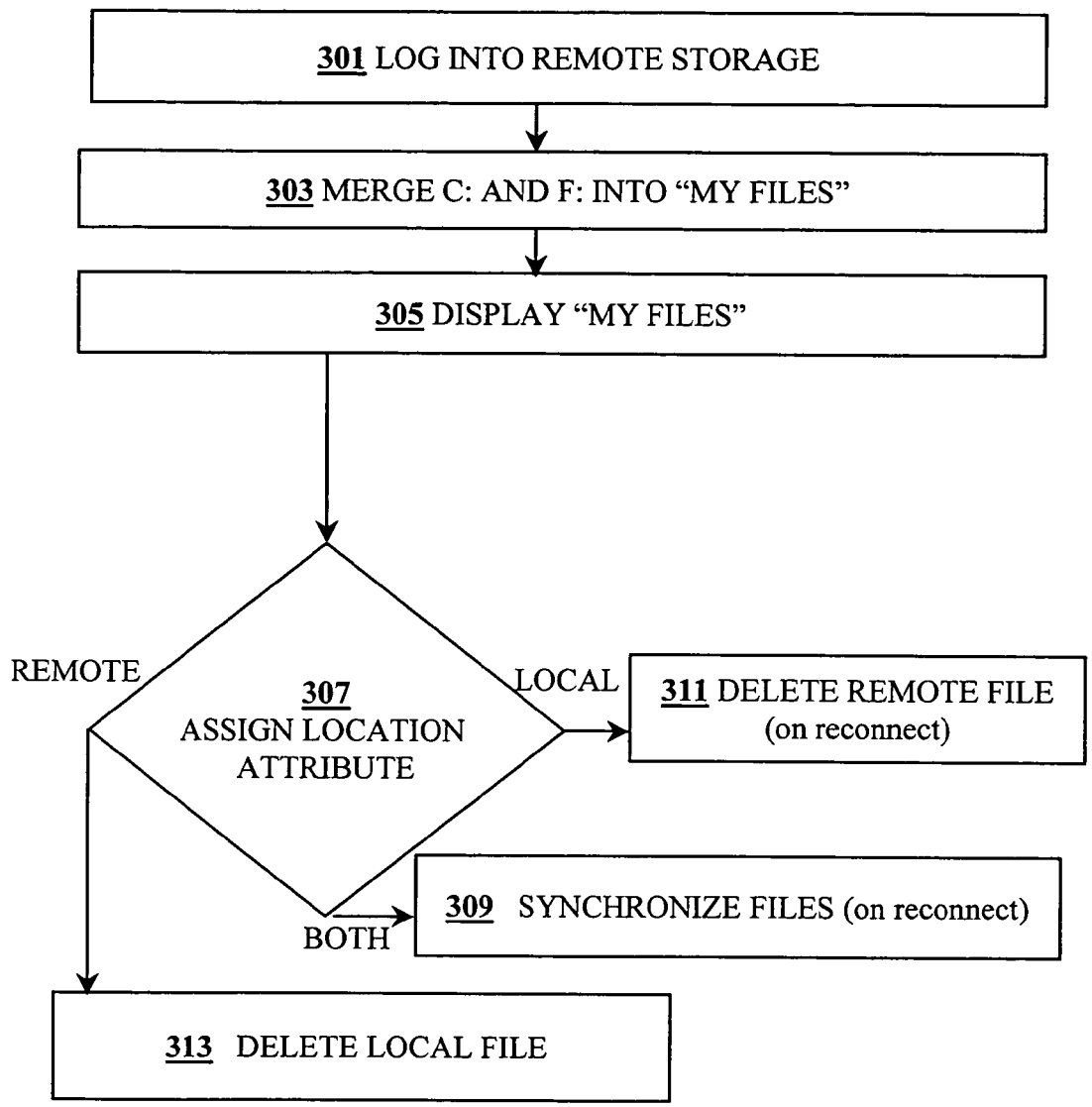
FIG. 3 is a drawing of a method for file management, according to the present invention.

FIG. 3 illustrates a method, according to an embodiment of the present invention. Referring to FIG. 3, the user logs in (step 301) to remote storage 110. Files in both local storage 113 and remote storage 110 are merged (step 303) into a single logical volume, "My files". Merging (step 303) typically includes tagging the files, to be included in logical volume "My files". The merged logical volume "My files" is displayed (step 305) to the user.

Figure 4:
FIG. 4 is a drawing of a computer display showing a file management system, according to an embodiment of the present invention.

Reference is now made also to FIG. 4. FIG. 4 illustrates a display 115b, according to an embodiment of the present invention. Display 115b displays to the user a directory of files residing both on local storage 113 and remote storage 110. The directory is always stored locally and synchronized with the remote logical volume F. Even if remote storage 110 is not connected to computer 10, the user can always see all the file names in "My files", as well as optionally assign (decision block 307) location attributes to each file name individually. If remote storage 110 is currently not connected to computer 10, actions involving remote storage 110 specified by the attributes for each file name are performed upon connecting computer 10 to remote storage 110. A remote/local location attribute can be individually assigned (decision block 307) using input mechanism 114, e.g. mouse. For example, a mouse click on the file name brings up a menu with three options (a) residing only on remote storage 110, (b) residing only on local storage 113, or (c) residing on both local storage 113 and remote storage 110. The user specifies individually (decision block 307), i.e. on an individual file-specific basis, where each file is stored; in remote storage 110 only, local storage 113 only, or both the local storage 113 and remote storage 110. When the location attribute for a file name is: residing only on remote storage 110, then the corresponding local file is deleted (step 313) from local storage 113. Similarly, when the location attribute for a file name is: residing only on local storage 113, then the corresponding remote file is deleted (step 311). If remote storage 110 is not connected to computer 10, then delete (step 311) is performed upon connecting to remote storage 110. When the location attribute for a file name is: residing on both local storage 113 and remote storage 110, then the corresponding files are synchronized, i.e. maintained with identical information. If remote storage 110 is not connected to computer 10, then synchronization (step 309) is performed upon connecting to remote storage 110. Synchronization (step 309) is performed automatically, manually or periodically according to a previously defined schedule.

In the example of FIG. 4, the location attribute, local, remote or both is displayed with an "x" in columns labeled "local" and "remote". According to another embodiment of the present invention, the user can differentiate between local or remote location attributes based on visual differentiation using for instance color-coding or status icons. For example, a file name of a file stored exclusively in remote storage 110 appears in black. A file stored both in remote storage 110 and local storage 113 will have a file name appear in blue, and a file stored exclusively in local storage 113 will have a file name appear in gray.

The following examples illustrate embodiments of the present invention.

EXAMPLE I

Sam has a 500 Gigabytes "C:" hard drive (local storage 113) installed on his personal computer 10. Sam is also subscribed to an Internet-network-based disk storage (block 110)

service that enables him access to an extra 100 Gigabytes. When Internet connectivity is detected, Sam the user is automatically, or manually prompted to enter a user name/password or other authentication mechanism and logged in (step 301) to remote storage 110. Both local and remote logical volumes C: and F: are combined to create a single logical volume, "My Files" in this example, with a total storage of 600 Gigabytes.

EXAMPLE II

Rosie has a mobile phone including local storage 113 of 128 megabytes. She is also subscribed to an Internet storage service that enables her access to an extra 256 megabytes of Internet-network-based disk storage (block 110). When Internet broadband connectivity is detected, Rosie is authenticated and she logs in (step 301) to her remote storage service. Both local storage 113 and remote storage 110 are combined (step 303) and displayed (step 305) to create a single logical volume "My files" of 384 megabytes.

EXAMPLE III

Elanor has a 512 megabytes personal USB storage device (remote storage 110). Elanor regularly uses a laptop computer 10 with 500 gigabyte disk drive (local storage 113). When Elanor plugs remote storage 110, e.g. USB personal storage device to host laptop computer 10, both the USB storage device (block 110) and one or more file folders stored in the disk drive (local storage 113) are merged (step 303) and displayed (step 305) as a single logical volume "My files" with capacity greater than 512 megabytes. Elanor regularly uses a file folder for digital images requiring collectively more than 512 megabytes. She finds the present invention convenient storing all of her digital images in local storage 113 in her laptop computer 10 while storing some of her digital images in the USB storage device (remote storage 110) and managing all her digital images as a single logical volume both when the USB storage device is connected to her laptop and when the USB storage is not connected.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A method of managing data storage comprising:
at a host device that includes local data storage and that is operatively coupled to a removable data storage device, wherein the local data storage stores a local version of a first file and the removable data storage device stores a remote version of the first file, and wherein the removable data storage device stores a second file without a local version of the second file being stored at the local data storage:
displaying as a single logical volume a first file name corresponding to the first file and a second file name corresponding to the second file, wherein the second file name is displayed independent of whether the removable data storage device is connected to the host device;
displaying a menu of location attribute options for the first file, the menu including a first location attribute option to maintain the first file only on the local data storage, a second location attribute option to maintain the first file only on the removable data storage device, and a third location attribute option to maintain the first file on the local data storage and on the removable data storage device;
in response to receiving a selection of the first location attribute option, assigning the first location attribute option to the first file and deleting the remote version of the first file from the removable data storage device; and
in response to receiving a selection of the second location attribute option, assigning the second location attribute option to the first file and deleting the local version of the first file from the local data storage.

2. The method of claim 1, further comprising merging first data files stored at the local data storage and second data files stored at the removable data storage device into the single logical volume prior to displaying the single logical volume.

3. The method of claim 1, wherein the single logical volume includes a third file name, the method further comprising:
displaying the first file name and an associated first location attribute indicator that references the first location attribute option;
displaying the second file name and an associated second location attribute indicator that references the second location attribute option; and
displaying the third file name and an associated third location attribute indicator that references the third location attribute option.

4. The method of claim 3, wherein when the third location attribute option is assigned to the third file name after the removable data storage device is disconnected from the host device, a synchronization action is performed upon reconnecting the removable data storage device to the host device.

5. The method of claim 1, wherein the removable data storage device is a personal storage device having a serial bus interface.

6. A host device comprising:
a local data storage;
a processor coupled to the local data storage;
a physical interface to enable communication between the processor and a removable data storage device when the removable data storage device is coupled to the processor;
a display device operatively coupled to the processor;
a first file name referencing a first file, wherein a local version of the first file is stored at the local data storage and a remote version of the first file is stored at the removable data storage device; and
a second file name referencing a second file stored at the removable data storage device without a local version of the second file being stored at the local data storage;
displaying as a single logical volume the first file name and the second file name, wherein the second file name is displayed independent of whether the removable data storage device is connected to the host device;
displaying a menu of location attribute options for the first file, the menu including a first location attribute option to maintain the first file only on the local data storage, a second location attribute option to maintain the first file only on the removable data storage device, and a third location attribute option to maintain the first file on the local data storage and on the removable data storage device; and an input mechanism to receive a selection of a location attribute option to the first file name; wherein:

in response to receiving the selection of the first location attribute option, assigning the first location attribute option to the first file and the remote version of the first file is deleted from the removable data storage device; and in response to receiving the selection of the second location attribute option, assigning the second location attribute option to the first file and the local version of the first file is deleted from the local data storage.

7. The host device of claim 6, wherein in response to receiving the selection of a third location attribute option, assigning the third location attribute option to the first file and the local version of the first file is synchronized with the remote version of the first file.

8. The host device of claim 7, wherein the synchronizing is performed manually.

9. The host device of claim 7, wherein the synchronizing is performed periodically according to a previously defined schedule.

10. A method of managing local data storage and remote data storage, the method comprising:

at a host device including a local data storage, the host device operatively coupled to a removable data storage device, displaying a plurality of file names referencing first data files stored in local storage and second data files stored in removable data storage device as a single logical volume, each file name referencing a corresponding file, wherein the removable data storage device stores a second file without a local version of the second file being stored at the local data storage;

wherein file names of the second data files are displayed independent of whether the removable data storage device is connected to the host device;

wherein the first data files including a local version of a first file are stored at the local data storage and the second data files including a remote version of the first file are stored at the removable data storage device;

displaying a menu of location attribute options for the first file, the menu including a first location attribute option to maintain the first file only on the local data storage, a second location attribute option to maintain the first file only on the removable data storage device, and a third location attribute option to maintain the first file on the local data storage and on the removable data storage device;

assigning a location attribute to a first file name that references the first file;

in response to the assigned location attribute being assigned a first location attribute option to the first file, deleting the remote version of the first file from the removable data storage device; and in response to the assigned location attribute being assigned a second location attribute option to the first file, deleting the local version of the first file from the local data storage.

11. The method of claim 10, wherein when the removable data storage device is disconnected from the host device and the first location attribute option is subsequently assigned to the first file name, the remote version of the first file is deleted from the removable data storage device upon reconnecting the removable data storage device to the host device.

12. The method of claim 10, further comprising when the assigned attribute is a third location attribute option to the first file, synchronizing the local version of the first file with the remote version of the first file.

13. The method of claim 12, wherein synchronizing the local version of the first file with the remote version of the first file is performed at a time according to a previously defined schedule.

14. The method of claim 10, wherein the removable data storage device comprises a flash drive.

15. The method of claim 10, further comprising maintaining a directory of the single logical volume to display the plurality of file names referencing the first data files and the second data files at the host device when the removable data storage device is decoupled from the host device.

16. The method of claim 10, further comprising: receiving user input corresponding to file actions related to files at the removable data storage device, wherein the user input is received when the removable data storage device is decoupled from the host; and performing the file actions related to the files at the removable data storage device upon connecting the removable data storage device to the host device.

17. The method of claim 10, wherein the removable data storage device comprises a universal serial bus storage device.

* * * * *